United States Patent [19]
Garland

[11] 3,741,039
[45] June 26, 1973

[54] VARIABLE SPEED TRANSMISSION WITH PROPORTIONAL INVERSE TORQUE REDUCTION

[76] Inventor: Milton W. Garland, 208 W. Second St., Waynesboro, Pa. 17268

[22] Filed: June 29, 1971

[21] Appl. No.: 158,004

[52] U.S. Cl. .................................................. 74/786
[51] Int. Cl. ............................................. F16h 3/44
[58] Field of Search ............................... 74/785, 786

[56] References Cited
UNITED STATES PATENTS

| | | | |
|---|---|---|---|
| 2,558,738 | 7/1951 | Davis, Jr. et al. | 74/785 |
| 2,212,046 | 8/1940 | Ross | 74/786 |
| 2,149,320 | 3/1934 | Szekely | 74/785 |
| 2,191,907 | 2/1940 | Filippis | 74/786 |
| 2,618,175 | 11/1952 | Bruce | 74/786 |
| 2,804,748 | 9/1957 | Hutchinson | 74/786 |
| 3,077,796 | 2/1963 | Johnson et al. | 74/785 |
| 3,240,083 | 3/1966 | Stoddard | 74/786 |
| 3,295,394 | 1/1967 | Whateley | 74/785 |
| 3,519,247 | 7/1970 | Christison | 74/785 |

*Primary Examiner*—C. J. Husar
*Attorney*—A. Yates Dowell and A. Yates Dowell, Jr.

[57] ABSTRACT

Transmission apparatus in which the input shaft may drive the output shaft at the same rotational speed or may drive the output shaft at an increased speed with proportional inverse torque reduction. The apparatus includes input and output shafts connected together by a unidirectional stop device and a gearing arrangement so that the speed of the output shaft may be increased with proportional inverse torque reduction when the input shaft is driving in one direction and having apparatus for preventing free wheeling when the output shaft becomes the driver.

5 Claims, 4 Drawing Figures

INVENTOR
MILTON W. GARLAND
ATTORNEYS

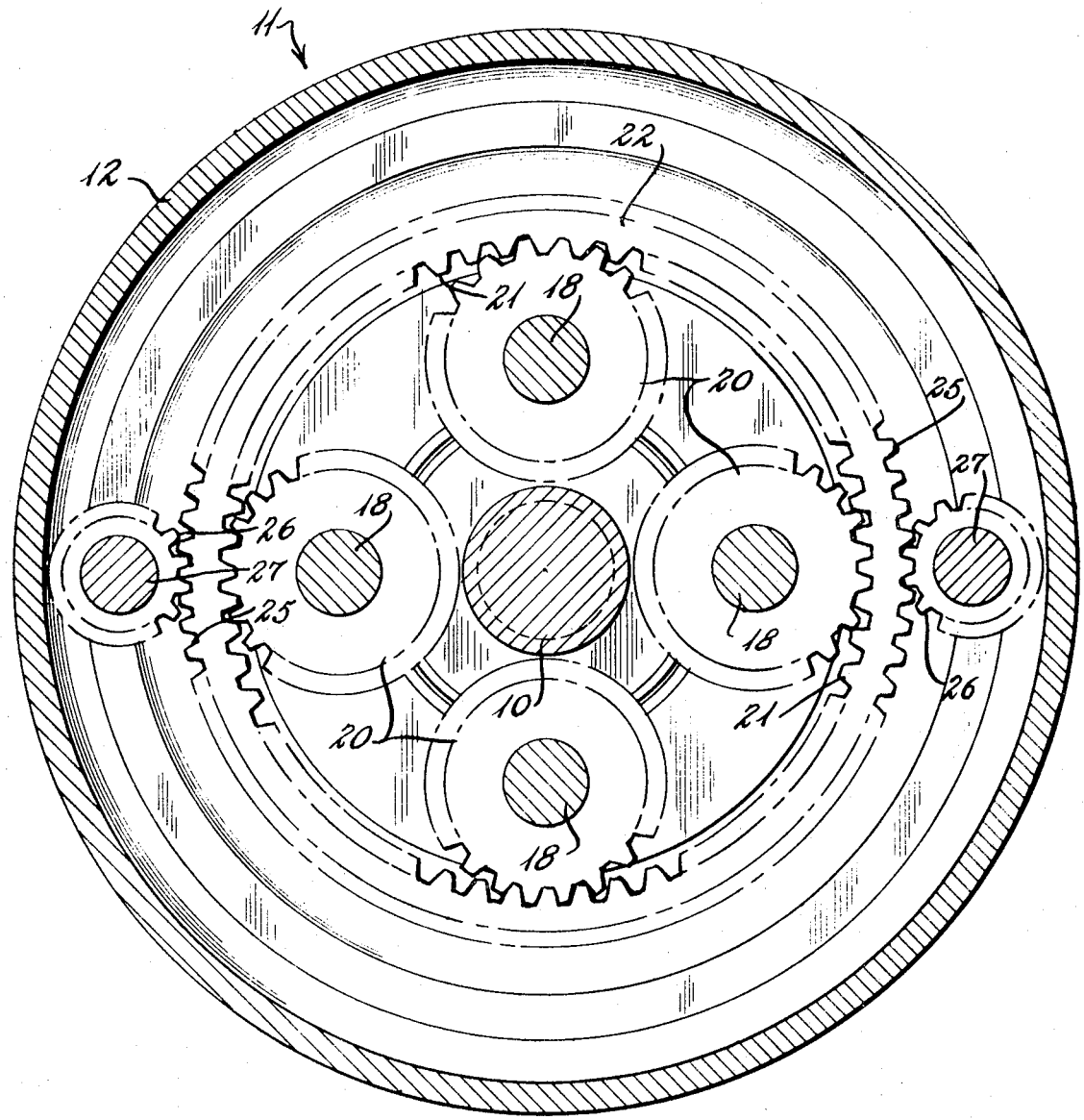

INVENTOR
MILTON W. GARLAND

VARIABLE SPEED TRANSMISSION WITH PROPORTIONAL INVERSE TORQUE REDUCTION

BACKGROUND OF THE INVENTION

1. Field of the Invention

This invention relates generally to transmission of driving force from one shaft to another and relates particularly to a continuously variable speed increase transmission with a proportional output torque reduction when driving force is applied to the normal input shaft.

2. Description of the Prior Art

Heretofore many transmissions have been provided for automobiles and other machinery including an input shaft and an output shaft and some of these transmissions have included variable speed devices such as the patents to Andershock U.S. Pat. No. 2,734,400, Stubbe U.S. Pat. No. 2,815,974, Winchester U.S. Pat. No. 2,923,177, and Jackson U.S. Pat. No. 3,262,336. However, most of these prior art devices have provided speed change only without modulating the torque force.

SUMMARY OF THE INVENTION

The present invention is a transmission having an input shaft capable of driving an output shaft at the same speed or at a continuously variable speed increase with a proportional inverse torque reduction in modulated amounts until the maximum output speed is reached within the limitations of the gear ratios provided. The input and output shafts are connected by a unidirectional stop which permits the output shaft to rotate faster than the input shaft but prevents the output shaft from rotating more slowly than the input shaft as long as the input shaft is driving. A second unidirectional stop is provided to cause the output shaft to drive the input shaft when the output shaft is driving. The apparatus includes a sun gear meshing with a plurality of planetary gears controlled by orbital gears meshing with a ring gear which in turn is controlled by modulating means which induce an inverse torque reduction to the output shaft.

It is an object of the invention to provide a direct connection between the input and output shafts through a unidirectional stop, provide continuous coupling of the input and output shafts so that no free wheeling action will take place, and provide a continuously variable speed-increasing apparatus with a proportional output torque reduction when the driving force is applied to the input shaft.

BRIEF DESCRIPTION OF THE DRAWINGS

FIG. 2 is a section on the line 2—2 of FIG. 1.

DESCRIPTION OF THE PREFERRED EMBODIMENT

Figure 1:
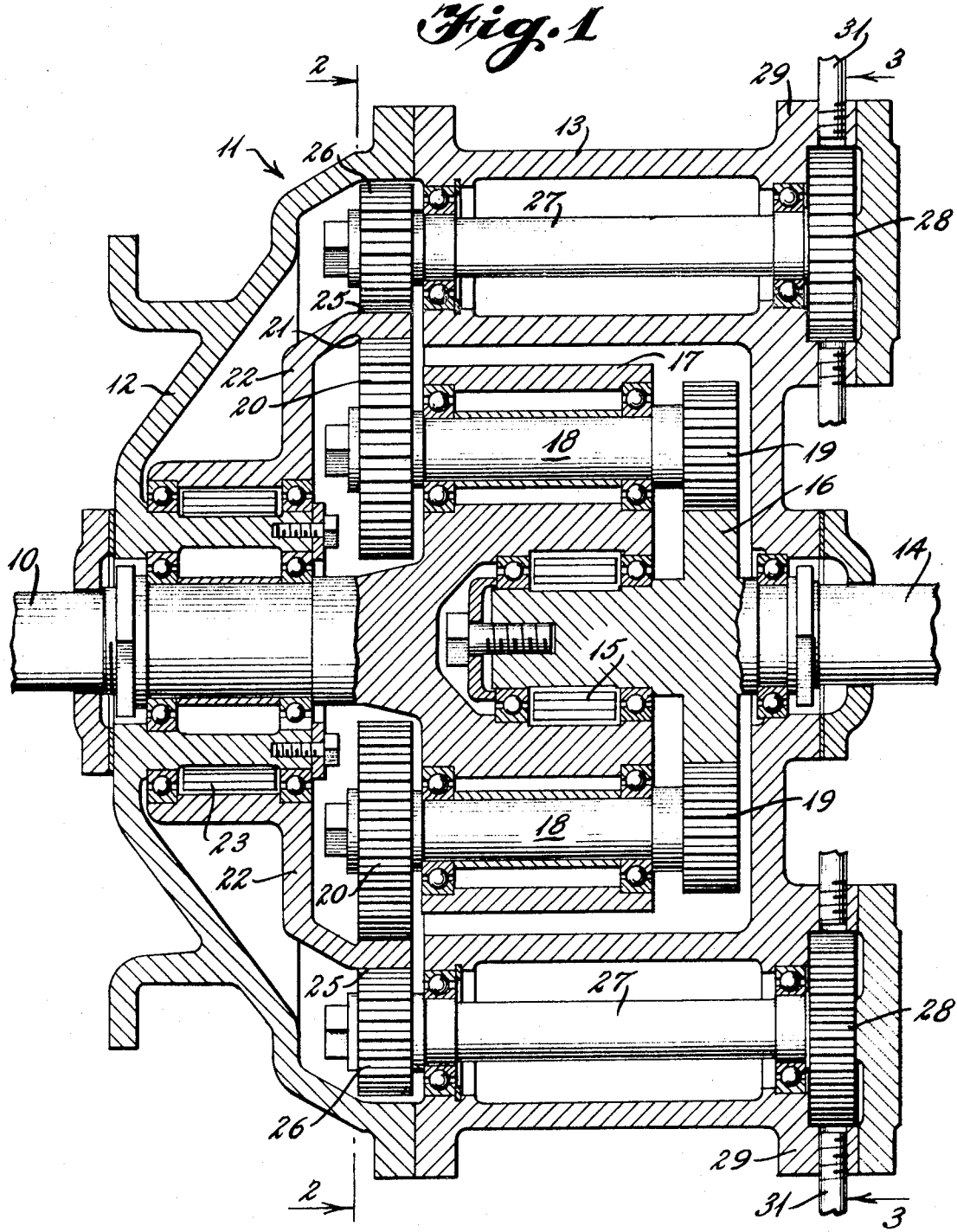
FIG. 1 is a vertical section through the transmission of the present invention.

With continued reference to the drawings, an input or drive shaft 10 is provided having one end connected to be driven by an internal combustion engine or other power plant (not shown). The other end of the input shaft is rotatably mounted within a fixed transmission housing 11 having a front portion 12 and a rear portion 13. An output or driven shaft 14 is freely rotatably mounted in the rear portion 13 and is connected to the input shaft 10 by a unidirectional stop 15 in such a manner that the input shaft 10 and the output shaft 14 are rotated at least at the same speed as long as the driving force is applied to the input shaft. Due to the unidirectional stop 15, the output shaft can be rotated faster than the input shaft 10.

In order to vary the speed of rotation of the output shaft 14 relative to the input shaft 10, a sun gear 16 is fixed to the output shaft 14 adjacent to the undirectional stop 15. A spider or planetary gear carrier 17 is fixed to the end of the input shaft 10 and such spider rotatably receives a plurality of planetary gear shafts 18. As illustrated in FIG. 2, four shafts 18 are provided, although any desired number can be used as long as they are equally balanced around the input shaft 10. A planetary gear 19 is mounted on the end of each of the shafts 18 and such planetary gears are adapted to mesh with the sun gear 16. An orbital gear 20 is mounted on the opposite end of each of the shafts 18 and normally such orbital gears are of a different size than the planetary gears 19 to provide a gear ratio therebetween.

The orbital gears 20 mesh with a ring gear 21 fixed to the inner surface of a ring gear support member 22. The support member 22 is connected by a second unidirectional stop 23 to the forward portion 12 of the transmission housing and such second unidirectional stop is disposed in a direction opposite the first unidirectional stop 15 to prevent free wheeling when the driving force is transferred to the output shaft 14, as when a vehicle is travelling downhill and the drive wheels are attempting to go faster than the power plant is rotating the input shaft.

Figure 3:
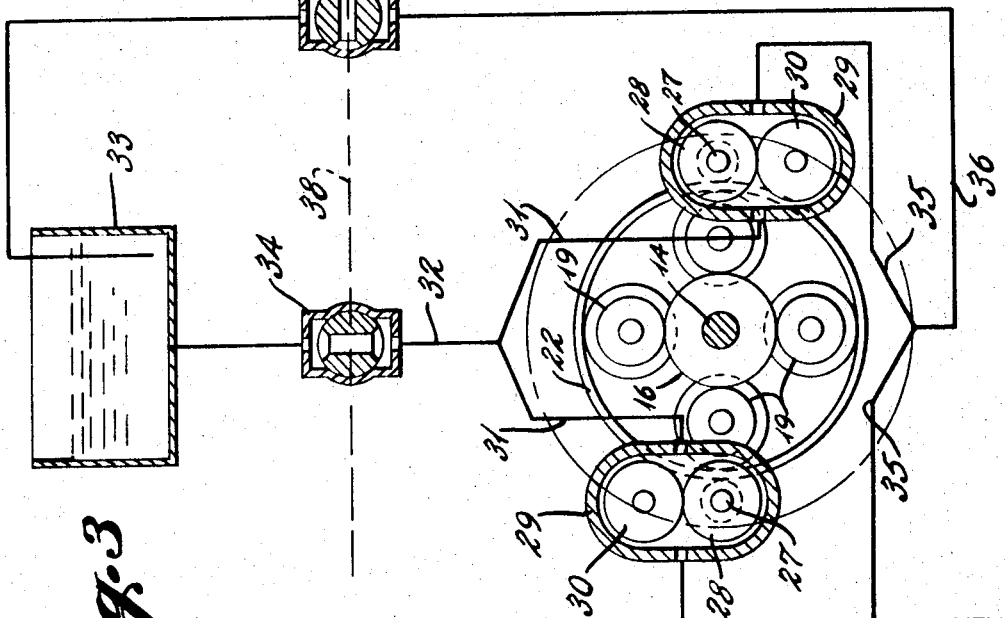
FIG. 3 is a schematic representation taken along the line 3—3 of FIG. 1 and illustrating a modulating control system in the maximum speed increase position.

A second ring gear 25 is fixed to or integrally formed with the outer surface of the support member 22 and such second ring gear meshes with a plurality of pinion gears 26 fixed to shafts 27 rotatably carried by the rear portion 13 of the transmission housing. A pump gear 28 is fixed to the opposite end of each of the shafts 27 and each of such pump gears is located within a pump housing 29 where they cooperate with a second pump gear 30, as illustrated in FIGS. 3 and 4.

To control the rotation of the pump gears 28 and 30, a fluid inlet line 31 is connected to the inlet side of each of the pump housings 29 and such fluid inlet lines are connected to a common header 32 which receives fluid from a sump 33 through a rotating plug-type flow control valve 34. A fluid outlet line 35 is connected to the outlet side of each of the pump housings 29 and such outlet lines are connected to a common outlet header which discharges fluid into the sump 33 through a rotating plug-type flow control valve 37. The flow control valves 34 and 37 are operated by a common shaft so that when one valve is fully open, the other valve will be fully closed, and vice versa. The position of the valves modulates the flow of fluid through the pump housings 29 for controlling the rate of rotation of the ring gear support member 22.

In the operation of the apparatus, when the input shaft 10 receives driving force in a clockwise direction, the output shaft 14 is driven at the same speed and in the same direction by the unidirectional stop 15 as long as the flow control valve 34 is closed and the flow control valve 37 is open so that there is no load on the pump gears 28 and 30. Under these conditions, the pump gears 28 and the pinion gears 26 are freely rotatable and therefore the ring gear support member 22 is freely rotatable and there will be no relative movement between the sun gear 16 and the planetary gears 19. If the driving force should be transferred to the output shaft 14, as when a vehicle is going downhill so that the unidirectional stop 15 becomes ineffective, the second unidirectional stop 23 engages the ring gear support member 22 and prevents free wheeling of the vehicle.

Figure 4:
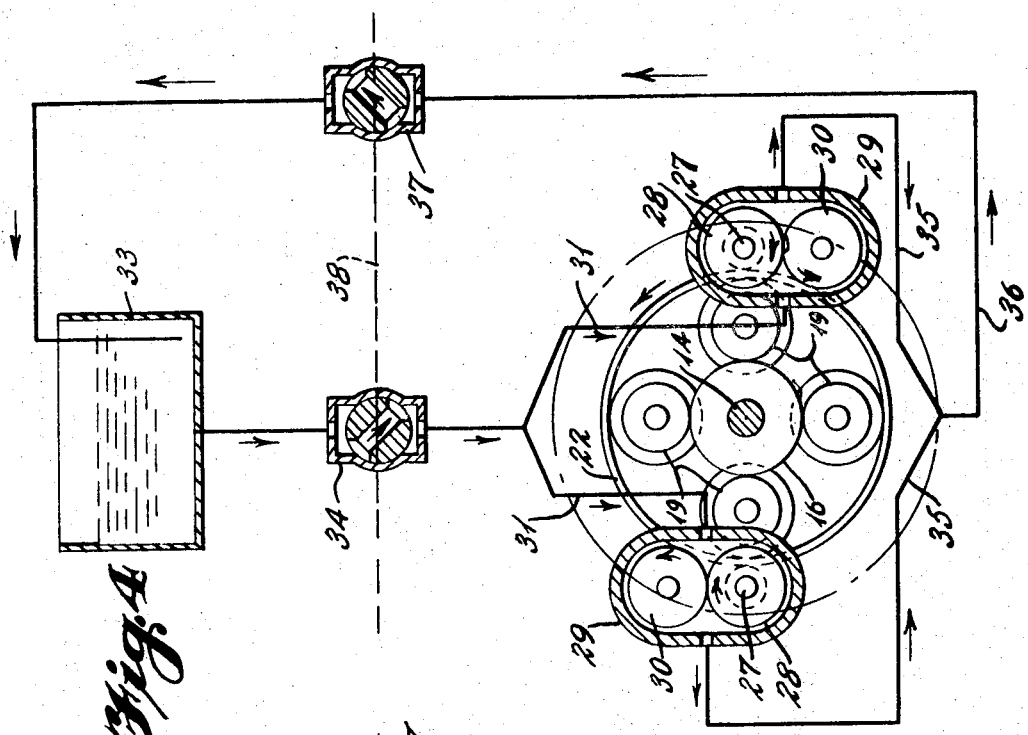
FIG. 4 is a schematic similar to FIG. 3 and illustrating the control system in position to modulate the speed of rotation of the output shaft.

In order to variably increase the speed of rotation of the output shaft 14 when the driving force is applied to the input shaft 10, the common shaft 38 is operated to partially open the flow control valve 34 and partially close the flow control valve 37, as illustrated in FIG. 4. In this position, fluid will flow from the sump 33 through the flow control valve 34 into the pump housings 29 to offer resistance to the rotation of the pump gears 28 and 30. When rotation of the pump gear 28 is restricted, rotation of the pinion gears 26 likewise is restricted and a load force is transmitted through the ring gear 25 to the support member 22 to function as a brake for such support member. Braking action of the ring gear carrier 22 causes a differential in the speed of rotation between the input shaft 10 and the ring gear support member 22 and causes the orbital gears 20 to rotate in a counterclockwise direction, which in turn causes the planetary gears 19 to rotate in a counterclockwise direction. The planetary gears 19 therefore drive the sun gear 16 and the output shaft 14 to which it is attached at a faster rate of rotation than the input shaft 10. The amount of fluid passing through the pump housing 29 determines the amount of braking action transmitted to the ring gear support member and thereby determines the increased speed of rotation of the output shaft caused by the gear ratio between the orbital gears 20 and the planetary gears 19.

As illustrated in FIG. 3, the flow control valve 34 is fully open and the flow control valve 37 is fully closed and presents a stalled condition of the pump gears 28 and 30. In this condition the pump housings 29 are filled with fluid; however, the fluid cannot move since the flow control valve 37 is closed and therefore substantially prevents rotation of the pump gears 28 and 30. When the pump gears are stalled, the pinion gears 26 likewise cannot rotate and therefore the ring gear support member 22 is substantially stalled to increase the speed of rotation of the output shaft to the maximum amount within the limits of the gear ratio between the orbital and planetary gears 20 and 19, respectively.

Since the pump housings 29, the shafts 27, and the pinion gears 26 are all carried by the transmission housing 11, the reaction forces are absorbed by the stationary housing to produce a proportional inverse torque reduction. When the reaction is absorbed by the stationary transmission housing, a leverage effect occurs which produces torque change. If the reaction is between elements of the moving parts, the reaction force eliminates the leverage effect and speed change only occurs.

I claim:

1. A variable speed transmission comprising a housing, input and output shaft means rotatably carried by said housing, first unidirectional stop means connecting said input shaft means and said output shaft means so that said input shaft means drives said output shaft means directly or indirectly, a sun gear fixed to said output shaft means, at least one planetary gear shaft rotatably carried by said input shaft means, a planetary gear fixed to said planetary gear shaft in meshing engagement with said sun gear, an orbital gear fixed to said planetary gear shaft in spaced relation to said planetary gear, a ring gear rotatably mounted within said housing in meshing engagement with said orbital gear, second unidirectional stop means located between said ring gear and said housing to permit rotation of said ring gear in one direction only and to stop rotation of said ring gear in the opposite direction, selectively adjustable brake means carried by said housing and engageable with said ring gear to selectively permit free rotation of said ring gear in one direction or to restrict rotation thereof in said one direction, whereby said input shaft means and said output shaft means are driven at the same speed when said ring gear is freely rotatable and are driven at different speeds when said ring gear is restricted by said brake means.

2. The structure of claim 1 in which said adjustable braking means includes a second ring gear mounted on said ring gear support member, shaft means rotatably carried by said housing, at least one pinion gear mounted on said braking means shaft and meshing with said second ring gear, and means for selectively restricting rotation of said braking means shaft.

3. The structure of claim 2 in which said means for selectively restricting said braking means shaft includes a pump gear mounted on said braking means shaft, means for selectively introducing fluid to said pump gear to retard rotation thereof.

4. In a variable speed transmission having a transmission housing, input and output shaft means having portions rotatably mounted within said housing, first unidirectional stop means connecting said input shaft means to said output shaft means so that said input shaft means drives said output shaft means in one direction, a sun gear fixed to said output shaft means, at least one planetary gear shaft rotatably carried by said input shaft means, a planetary gear mounted on one end of said planetary gear shaft and adapted to mesh with said sun gear, an orbital gear mounted on the opposite end of said planetary gear shaft, a ring gear support member rotatably mounted within said housing, said support member having a ring gear meshing with said orbital gear, the improvement comprising a second unidirectional stop means mounting said ring gear support member on said housing to permit rotation in one direction only, and selectively adjustable braking means carried by said housing and engageable with said ring gear support member to permit free rotation of said support member in one direction or restrict rotation of said ring gear support member in said one direction.

5. The structure of claim 4 in which said adjustable braking means includes a second ring gear mounted on said ring gear support member, a braking means shaft rotatably carried by said housing, a pinion gear fixed to one end of said braking means shaft and adapted to mesh with said second ring gear, the opposite end of said braking means shaft extending into a pump housing, a first pump gear fixed to aid braking means shaft within said pump housing, a second pump gear rotatably mounted in said pump housing in a position to cooperate with said first pump gear and means for selectively introducing fluid into said pump housing to vary the restriction on said pump gears.

* * * * *